US010382432B2

(12) United States Patent
Malmborg et al.

(10) Patent No.: US 10,382,432 B2
(45) Date of Patent: Aug. 13, 2019

(54) METHOD FOR READING OUT ACCESS AUTHORIZATIONS OR ID'S FROM AT LEAST ONE CUSTOMER MEDIUM BY MEANS OF AT LEAST ONE READER OF AN ACCESS CONTROL DEVICE AND FOR EVALUATING THE SELECTED ID'S OR ACCESS AUTHORIZATIONS

(71) Applicant: SKIDATA AG, Grödig/Salzburg (AT)

(72) Inventors: Anders Malmborg, Salzburg (AT); Thomas Grasmann, Grödig (AT); Andreas Fellner, St. Wolfgang (AT)

(73) Assignee: Skidata AG, Grödig/Salzburg (AT)

( * ) Notice: Subject to any disclaimer, the term of this patent is extended or adjusted under 35 U.S.C. 154(b) by 198 days.

(21) Appl. No.: 15/598,486

(22) Filed: May 18, 2017

(65) Prior Publication Data
US 2017/0346816 A1 Nov. 30, 2017

(30) Foreign Application Priority Data
May 25, 2016 (EP) .................................... 16171378

(51) Int. Cl.
*H04L 29/06* (2006.01)
*G07C 9/00* (2006.01)
(Continued)

(52) U.S. Cl.
CPC ...... *H04L 63/0853* (2013.01); *G07C 9/00007* (2013.01); *G07C 9/00174* (2013.01);
(Continued)

(58) Field of Classification Search
CPC . H04L 63/0853; H04L 63/08; H04L 63/0861; H04L 9/3234; G07C 9/00007; G07C 9/00174; H04W 12/06; G06F 21/31
See application file for complete search history.

(56) References Cited

U.S. PATENT DOCUMENTS 7,190,937 B1 3/2007 Sullivan et al.
2008/0147953 A1* 6/2008 Lawandus ........... H04L 63/0861
710/313

(Continued)

FOREIGN PATENT DOCUMENTS

EP 2234032 A2 9/2010

OTHER PUBLICATIONS

Ponert et al. Read device for an access control device. Machine translation of EP 2234032 (cited in the IDS filed Jun. 14, 2017). Accessed at [https://patents.google.com/patent/EP2234032A2/en?oq=EP2234032] on Jan. 28, 2018. (Year: 2018).*

(Continued)

*Primary Examiner* — Robert B Leung
(74) *Attorney, Agent, or Firm* — David & Bujold PLLC; Michael J. Bujold

(57) ABSTRACT

A method of reading out access authorizations or ID's from at least one customer medium by at least one reader (3, 4, 5) of an access control device (2) and evaluating the selected ID's or access authorizations. All readers are activated and perform a scan for ID's or access authorizations, which can be contained or stored in at least one customer medium. The selected ID's or access authorizations are transmitted to a controller which temporarily stores and transmits them to an evaluation unit (1) while the readers continue to scan for possible ID's or access authorizations. If an evaluation in the evaluation unit finds that a selected access authorization is valid or allocated to a selected ID, the readers are deactivated, and access is granted. If, after a prescribed time, no further ID's or access authorizations are read out, transmitted and recognized as valid, then access is denied.

4 Claims, 2 Drawing Sheets

(51) Int. Cl.
*H04L 9/32* (2006.01)
*H04W 12/06* (2009.01)
*G06F 21/31* (2013.01)

(52) U.S. Cl.
CPC .......... *H04L 9/3234* (2013.01); *H04W 12/06* (2013.01); *G06F 21/31* (2013.01); *H04L 63/0861* (2013.01)

(56) References Cited

U.S. PATENT DOCUMENTS

| | | |
|---|---|---|
| 2011/0043362 A1 | 2/2011 | Reibel |
| 2014/0094967 A1* | 4/2014 | Grow ..................... G07F 17/10 700/241 |
| 2015/0363582 A1* | 12/2015 | Sheller ................... G06F 21/31 726/17 |

OTHER PUBLICATIONS

European Search Report issued in corresponding European Patent Application No. 16171378.9 dated Dec. 16, 2016.

* cited by examiner

METHOD FOR READING OUT ACCESS AUTHORIZATIONS OR ID'S FROM AT LEAST ONE CUSTOMER MEDIUM BY MEANS OF AT LEAST ONE READER OF AN ACCESS CONTROL DEVICE AND FOR EVALUATING THE SELECTED ID'S OR ACCESS AUTHORIZATIONS

This application claims priority from European patent application serial no. 16171378.9 filed May 25, 2016.

FIELD OF THE INVENTION

The present invention relates to a method for reading out access authorizations or ID's from at least one customer medium by means of at least one reader of an access control device and for evaluating the selected ID's or access authorizations. In particular, the invention relates to a method for reading out access authorizations or ID's from at least one customer medium by means of at least one reader of an access control device and for evaluating the selected ID's or access authorizations for a case in which several ID's or access authorizations are stored, possibly with various standards, and also for a case in which an access control device exhibits several readers for different types of customer media.

BACKGROUND OF THE INVENTION

Known from prior art for access control is to use customer media on which access authorizations or ID's are stored or which contain access authorizations and ID's, wherein access authorizations are allocated to the ID's. After an ID has been read out of a customer medium, it is evaluated whether a valid access authorization has been allocated to the ID in a server of the access control system, so as to grant or deny access.

According to prior art, if an access control device exhibits readers for different types of customer media and different standards, all readers are activated, wherein if one reader acquires on ID or an access authorization, the other readers are deactivated, and the acquired ID or access authorization is transmitted to a server of the access control system for evaluation. In the case of a valid access authorization, access is granted; if no valid access authorization is present, access is denied, and all readers are activated to again acquire ID's or access authorizations.

In customer media that support the RFID pursuant to standards ISO 14443 and ISO 15693, the customer medium in prior art is read out by means of an RFID reader that supports both standards solely according to ISO 15693. Therefore, if an ID having a valid access authorization allocated to it is stored on the customer medium according to another standard, it is not read out. If a customer medium supports several standards, for example RFID and barcode, the readout first takes place according to the RFID standard given the difference in readout speeds, so that, if no valid ID or access authorization exists, access is denied, even though a valid barcode ID can be stored, which causes confusion among users. Therefore, the evaluation of access authorizations disadvantageously takes a very long time.

SUMMARY OF THE INVENTION

The object of the present invention is to indicate a method for reading out access authorizations or ID's from at least one customer medium by means of at least one reader of an access control device, and for evaluating the selected ID's or access authorizations, the implementations of which avoids the mentioned disadvantages to prior art.

Therefore proposed is a method for reading out access authorizations or ID's from at least one customer medium by means of at least one reader of an access control device, and for evaluating the selected ID's or access authorizations, within the framework of which all readers are activated and in parallel perform a scan for ID's or access authorizations, which can be contained or stored in at least one customer medium, wherein the selected ID's or access authorizations are transmitted to a controller of the access control device, which are temporarily stored in the access control device and transmitted to an evaluation unit in prescribed intervals or transmitted to the evaluation unit immediately after selected, while the readers continue to scan for possible ID's or access authorizations, wherein, if an evaluation in the evaluation unit finds that a selected access authorization is valid or a valid access authorization has been allocated to a selected ID, the readers are deactivated, and access is granted by actuating a locking element of the access control device for opening purposes, and wherein, if no further ID's or access authorizations are read out, transmitted to the evaluation unit, and recognized as valid after a prescribed time since the readers were activated that corresponds to the time required by the slowest reader to read out an access authorization or an ID plus an offset, access is denied.

In the sense of the invention, customer media are all media suitable for storing or containing an access authorization or an ID that can be read out or acquired by a reader. For example, a license plate is a customer medium in the sense of the invention, wherein the registration number serves as the ID that can be acquired by a camera with corresponding software serving as the reader. Customer media can also include biometric features, which can be acquired by a suitable reader, for example by a fingerprint or iris scanner, or a camera with facial recognition software. Additional customer media can be RFID tags, portable electronic devices with RFID, Bluetooth, Bluetooth low energy, WLAN or UWB functionality, barcodes, magnetic cards or acoustic signatures. The evaluation unit can be arranged in the access control device or in a server connected with the access control devices for purposes of data communications. The access control devices can be access control devices for vehicles or people.

If a customer medium can be read out by a reader according to different standards, for example which is the case for RFID readers, which support the ISO 14443 and ISO 15693 standards, the customer medium is sequentially read out by the reader according to the different standards, wherein the access authorizations or ID's read out according to the respective standard are temporarily stored, and, while the customer medium is being read out according to additional standards, transmitted to the evaluation unit, wherein this procedure is repeated until such time as either the previously read ID's or access authorizations are successfully examined, and/or no additional ID's or access authorizations are detected.

If a selected access authorization is valid or a valid access authorization has been allocated to a selected ID, access is granted.

As provided within the framework of a further development, if no selected access authorization is valid or a valid access authorization has not been allocated to any selected ID, or if no access authorization or ID has been read out, the controller is queried as to whether another customer medium is present, wherein access is denied if no additional customer medium is present, and wherein a sequential readout of the customer medium according to the different standards is again performed when an additional customer medium is present, wherein the access authorizations or ID's read out according to the respective standard are temporarily stored, and, while the customer medium is read out according to additional standards, transmitted to the evaluation unit, wherein this process is repeated until such time as either the previously read ID's or access authorizations are successfully examined, and/or no additional ID's or access authorizations are detected, wherein access is granted if a selected access authorization is valid or a valid access authorization has been allocated to a selected ID, and wherein access is denied if no selected access authorization is valid or a valid access authorization has not been allocated to any selected ID or if no access authorization or ID has been selected.

As a result of the inventive concept, the at least one customer medium is read out in parallel by several readers, thereby increasing the evaluation speed. In readers that support several standards, the at least one customer medium is sequentially read out according to all supported standards, and already selected access authorizations are ID's are evaluated while the customer medium is read out according to additional standards, all of which additionally ensures that, given a valid access authorization or an ID with a valid access authorization allocated to it, the latter is acquired during the access control, wherein this parallel processing also increases the speed of the access control.

BRIEF DESCRIPTION OF THE DRAWINGS

The invention will be exemplarily described in greater detail below based on the attached figures. Shown on.

DETAILED DESCRIPTION OF THE PREFERRED EMBODIMENTS

Figure 1:
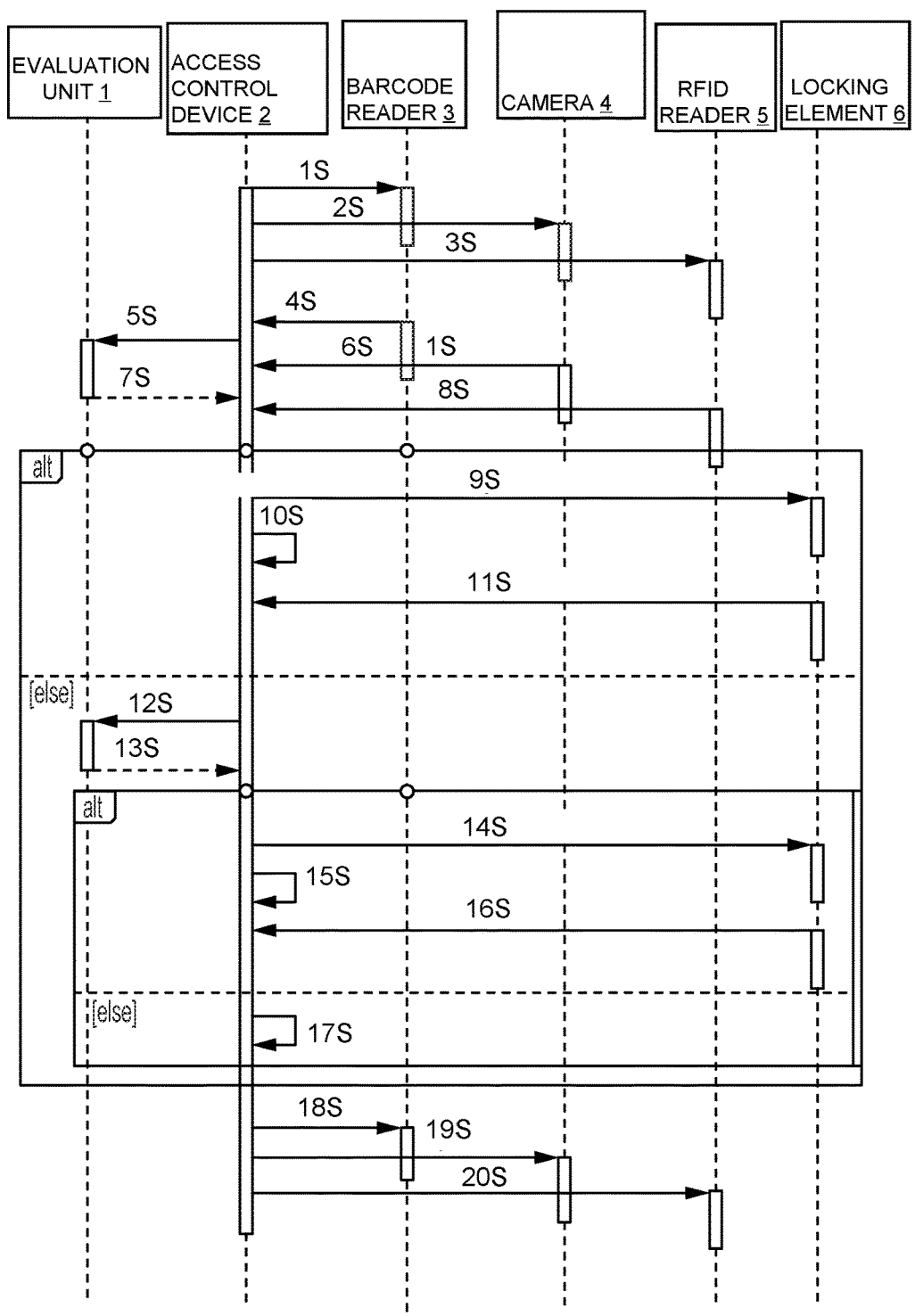
FIG. 1: is a flowchart to illustrate the method according to the invention for a case in which the access control device is an access control device for vehicles, and as readers exhibits an RFID reader, a barcode reader and a camera for character recognition.

An evaluation unit is marked 1 on FIG. 1, and can be arranged in an access control device 2 or in a server connected with the access control device for purposes of data communication. The access control device 2 exhibits three readers, wherein a first reader is designed as a barcode reader 3, a second reader as a camera 4 for character recognition, and a third reader 5 as an RFID reader. The access control device 2 exhibits a locking element 6 preferably designed as a barrier beam, which is actuated for opening purposes given a valid access authorization.

At the beginning of the method, all readers 3, 4, 5 of the access control device 2 are activated (steps 1S, 2S, 3S for activating the barcode reader 3, camera 4 and RFID reader 5), and in parallel perform a scan for ID's or access authorizations, which can be contained in at least one customer medium or stored thereon, wherein the selected ID's or access authorizations are transmitted to a controller of the access control device 2 (steps 4S, 6S, 8S), which transmits the latter to the evaluation unit 1 for evaluation (step 5S), while the readers 4, 5 continue to scan for possible ID's or access authorizations. In the example shown, the barcode reader 3 at the first reader selected as ID that was transmitted by the controller of the access control device 2 to the evaluation unit 1 (step 5S), wherein the result of the evaluation was transmitted to the controller by the evaluation unit 1 (step 7S).

If the evaluation in the evaluation unit reveals that the ID read out by the barcode reader 3 has a valid access authorization allocated to it, the readers 3, 4, 5 are deactivated, and access is granted by having the controller of the access control device 2 actuate the locking element 6 for opening purposes, wherein once the locking element 6 is actuated for closing purposes after the vehicle has passed through, this is transmitted to the controller of the access control device 2 (steps 9S, 10S, 11S).

If the evaluation in the evaluation unit reveals that the ID read out by the barcode reader 3 has no valid access authorization allocated to it, and the readers have read out ID's or access authorizations within a prescribed time since the of the readers 3, 4, 5 were activated that corresponds to the time required by the slowest reader to read out an access authorization or an ID plus a prescribed, applicable offset, these are transmitted to the evaluation unit 1 for evaluation (step 12S), wherein the evaluation result is transmitted by the evaluation unit 1 to the controller (step 13S). If the result is positive, access is granted by having the controller of the access control device 2 actuate the locking element 6 for opening purposes, wherein once the locking element 6 has been actuated for closing purposes after the vehicle has passed through, this is transmitted to the controller of the access control device 2 (steps 14S, 15S, 16S). In the sense of the invention, access means that a person or vehicle can pass in the direction of passage of the access control device.

If no additional ID's or access authorizations are read out, transmitted to the evaluation unit and recognized as valid after a prescribed time since the readers 3, 4, 5 were activated that corresponds to the time required by the slowest reader to read out an access authorization or an ID plus a prescribed, applicable offset, access is denied (step 17S), and all readers 3, 4, 5 are activated so as to check the next vehicle or, in case of an access control device for people, the next person for a valid access authorization (steps 18S, 19S, 20S).

Figure 2:
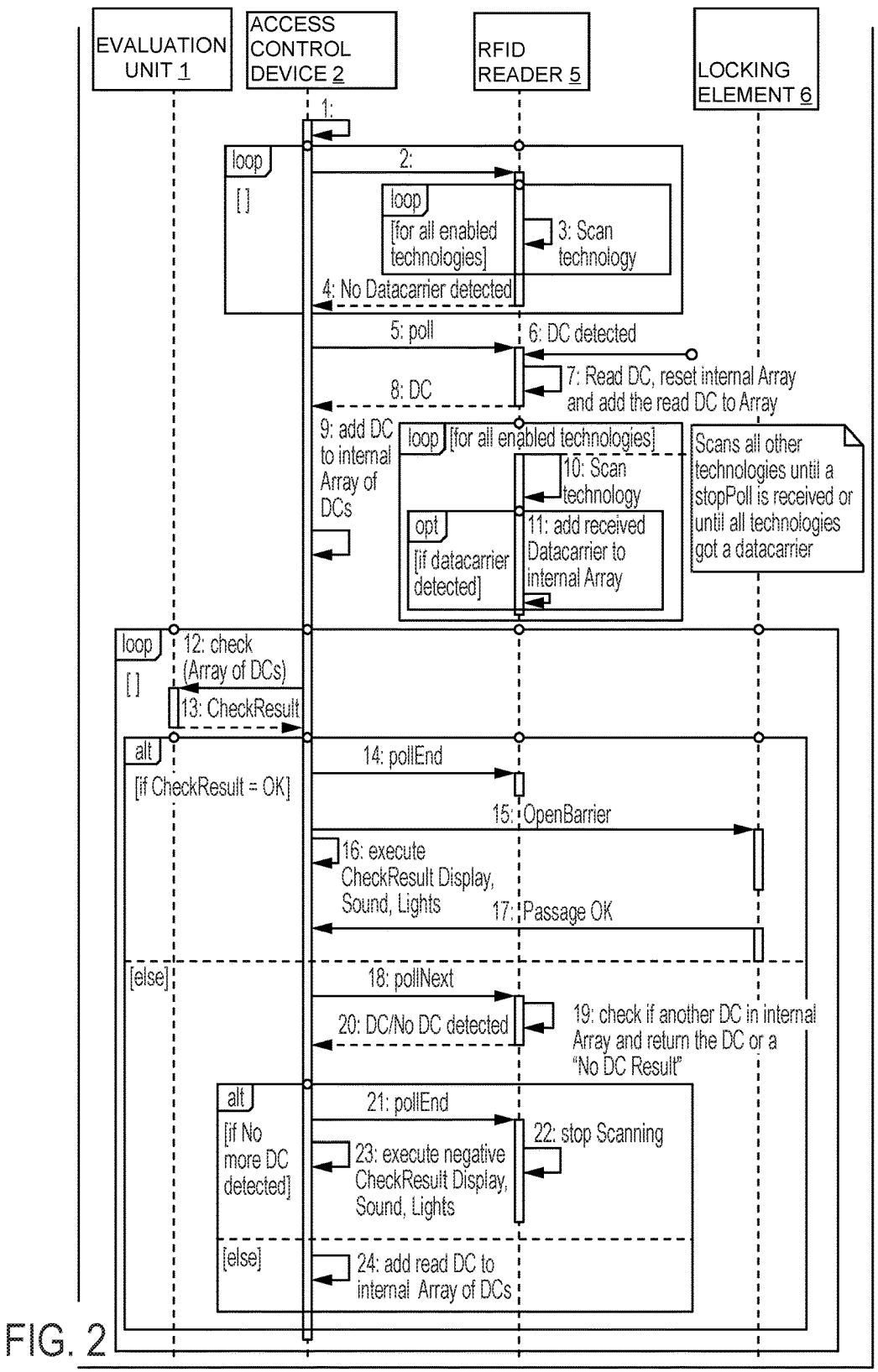
FIG. 2: is a flowchart to illustrate the method according to the invention for a case in which a customer medium can be read by an RFID reader according to different standards.

In a case where a customer medium can be read out by a reader of an access control device according to different standards, for example as holds true for the RFID reader 5, which supports RFID standards ISO 14443 and ISO 15693, the procedure is as follows according to a further development of the invention and drawing reference to FIG. 2:

In the example shown, the contents of a temporary file in the access control device 2 containing ID's or access authorizations are initially deleted (step 1:). Within the framework of the process, a customer medium (DC, data carrier) is sequentially searched by the reader 5 for the different standards (steps 2:-8:). As soon as an ID has been recognized (step 6:), a temporary file in the reader 5 is deleted, and the read access authorization or ID is stored (step 7:) and relayed to the access control device 2, wherein this access authorization or ID can also b temporarily stored in the temporary file in the access control device 2 (step 9:). While the customer medium is read out by the reader 5 for additional standards (steps 10:, 11:) and additional selected access authorizations or ID's are temporarily stored in the temporary file in the reader 5 or in the temporary file in the access control device 2, the first selected ID or access authorization is in parallel thereto transmitted to the evaluation unit 1 for evaluation (step 12:), wherein the evaluation results are transmitted by the evaluation unit 1 to the controller (step 13:). If access authorizations or ID's are read out according to an additional standard, these are transmitted to the evaluation unit 1 for evaluation after stored in a temporary file analogously to the procedure described.

If one or several readers support several standards, the method described based on FIG. 1 can integrate the steps of reading out sequentially according to the different supported standards, temporarily storing the selected access authorizations or ID's and transmitting the selected access authorizations or ID's to the evaluation unit, while the customer medium is read out according to additional standards, wherein this process is repeated until such time as either the previously read ID's or access authorizations are successfully examined, and/or no additional ID's or access authorizations are detected.

If a selected access authorization is valid or a selected ID has a valid access authorization allocated to it, the reader is deactivated 5 (step 14:), wherein the controller of the access control device 2 actuates the locking element 6 for opening purposes, wherein the locking element 6 is actuated for closing purposes after the vehicle or person has passed through, and this is transmitted to the controller of the access control device 2 (steps 15:, 16:, 17:). An optical and/or acoustic signal can here be generated while actuating the locking element 6 for opening purposes.

If no selected access authorization is valid or a valid access authorization has not been allocated to any selected ID, or if no access authorization or ID has been read out, it can optionally be provided that the controller be queried as to whether another customer medium is present (steps 18:, 19:, 20:), wherein the reader is deactivated and access is denied if no additional customer medium is present (steps 21:, 22:, 23:), and wherein a sequential readout of the customer medium according to the different standards is again performed when an additional customer medium is present, as already described for the case of the first customer medium, wherein the access authorizations or ID's read out according to the respective standard are temporarily stored (step 24). Analogously to the already described procedure, the selected access authorizations or ID's are transmitted to the evaluation unit, while the customer medium is read out according to additional standards, wherein access is granted if a selected access authorization is valid or a valid access authorization has been allocated to a selected ID, and wherein access is denied if no selected access authorization is valid or a valid access authorization has not been allocated to any selected ID or if no access authorization or ID has been selected (steps 21:, 22:, 23:). An optical and/or acoustic signal can optionally signal that access has been denied.

The invention claimed is:

1. A method of reading out access authorizations or IDs from at least one customer medium by at least one reader (3, 4, 5) of an access control device (2) and for evaluating a selected ID or a selected access authorization,
   wherein all of the readers (3, 4, 5) are activated and perform a scan, in parallel, for at least one ID or access authorization, which is contained or stored in at least one customer medium,
   each selected ID or access authorization is transmitted to a controller of the access control device (2), which temporarily stores each selected ID or access authorization in the access control device (2), and transmits each selected ID or access authorization to an evaluation unit (1) in prescribed intervals or transmits each selected ID or access authorization to the evaluation unit (1) immediately after selection, while the readers (3, 4, 5) continue to scan for other possible IDs or access authorizations,
   if an evaluation in the evaluation unit (1) finds that the selected access authorization is valid or a valid access authorization was allocated to the selected ID, the readers (3, 4, 5) are deactivated, and access is granted by actuating and opening a locking element (6) of the access control device, and
   if, after a prescribed time since the readers (3, 4, 5) were activated that corresponds to the time required by a slowest reader (3, 4, 5) to read out an access authorization or an ID plus an applicable offset, and no further IDs or access authorizations are read out, transmitted to the evaluation unit, (1) and recognized as valid, then access is denied.

2. The method according to claim 1, wherein, if a customer medium is read out by a reader (5) according to different standards, the customer medium is sequentially read out by the reader (5) according to the different standards, the access authorizations or IDs read out according to the respective standard are temporarily stored, and, while the customer medium is being read out according to additional standards, transmitted to the evaluation unit (1), and this procedure is repeated until such time as at least one of either the previously read IDs or access authorizations are successfully examined or no additional IDs or access authorizations are detected.

3. The method according to claim 1, wherein the customer media are media suitable for storing or containing a valid access authorization or a valid ID which is readable or acquirable by one of the readers (5).

4. The method according to claim 1, wherein the customer media is at least one of a vehicle license plate, a biometric feature, an RFID tag, a portable electronic device with RFID, Bluetooth, a Bluetooth low energy, WLAN or UWB functionality, a barcode, a magnetic card or an acoustic signature.

* * * * *